May 19, 1953 J. S. WOODWARD 2,638,993
HYDRAULIC CONTROL APPARATUS FOR INTERNAL-COMBUSTION
ENGINES AND VARIABLE PITCH PROPELLERS
Filed Oct. 1, 1947 3 Sheets-Sheet 3

Inventor
James S. Woodward
by Lester W Clark
Attorney

Patented May 19, 1953

2,638,993

UNITED STATES PATENT OFFICE 2,638,993

HYDRAULIC CONTROL APPARATUS FOR INTERNAL-COMBUSTION ENGINES AND VARIABLE PITCH PROPELLERS

James S. Woodward, West Hartford, Conn., assignor to Niles-Bement-Pond Company, West Hartford, Conn., a corporation of New Jersey Application October 1, 1947, Serial No. 777,323

19 Claims. (Cl. 170—135.74)

1

The present invention relates to control apparatus for internal combustion engines, and particularly for aircraft engines driving variable pitch propellers.

The invention is illustrated as applied to a turbine-jet engine, although it may be applied to any internal combustion engine. Such engines are commonly provided with means for controlling the supply of fuel to the engine and with means for varying the propeller pitch to control the torque load on the engine.

It is an object of the present invention to provide improved means for coordinating the operations of the fuel and torque controls for an engine of the type described.

Another object of the present invention is to provide an improved engine control system including two manual control levers, wherein one control lever sets the power by setting the fuel supply and the torque load and the other lever sets the speed of the engine through the use of suitable governor mechanism.

Another object is to provide improved means for coordinating the two manual controls in response to changes in the rate of combustion air flow through the engine and the engine temperature.

A further object is to provide improved means for interlocking the two manual controls with each other and with other engine operating controls.

Figure 1:
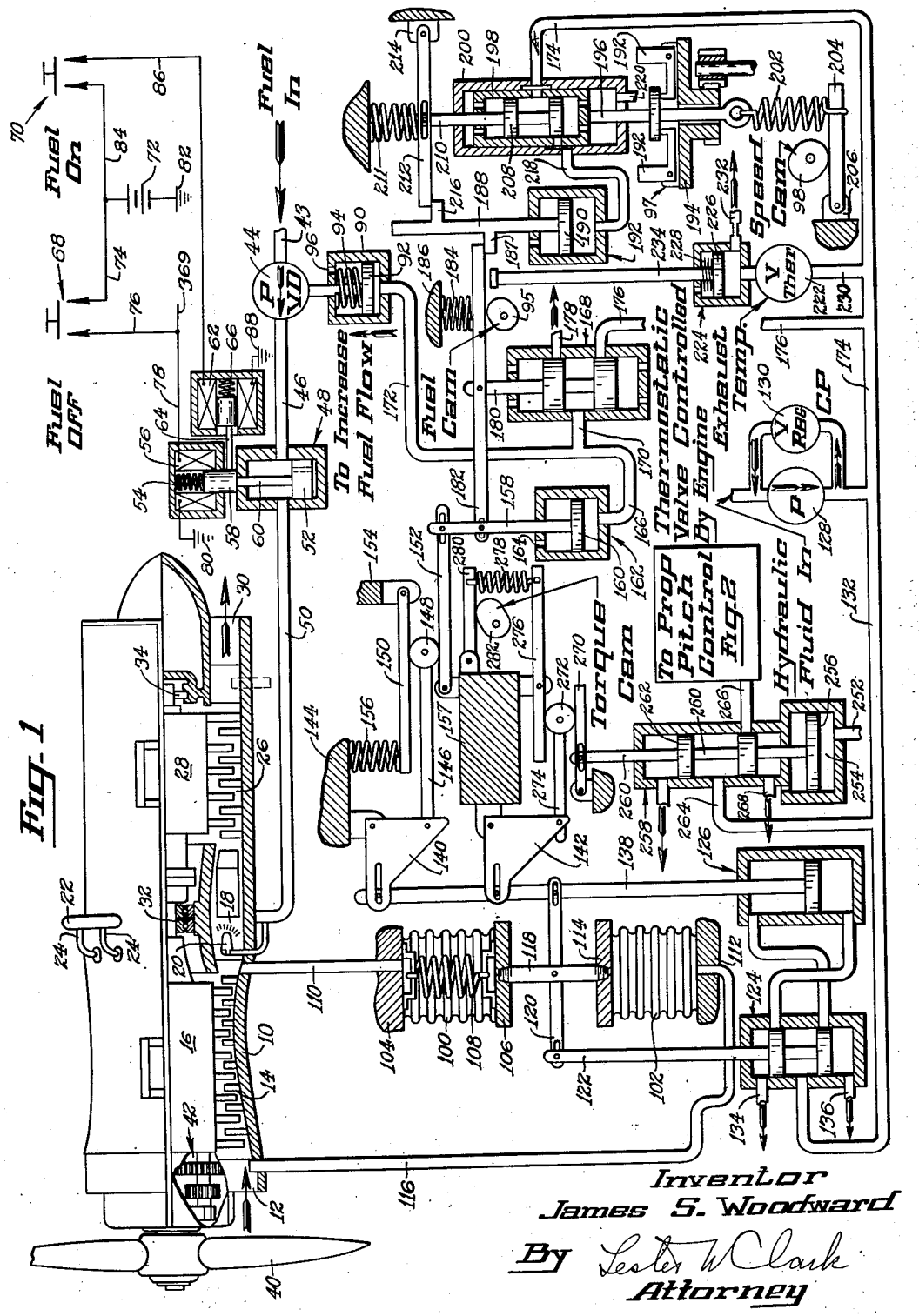
Figure 2:
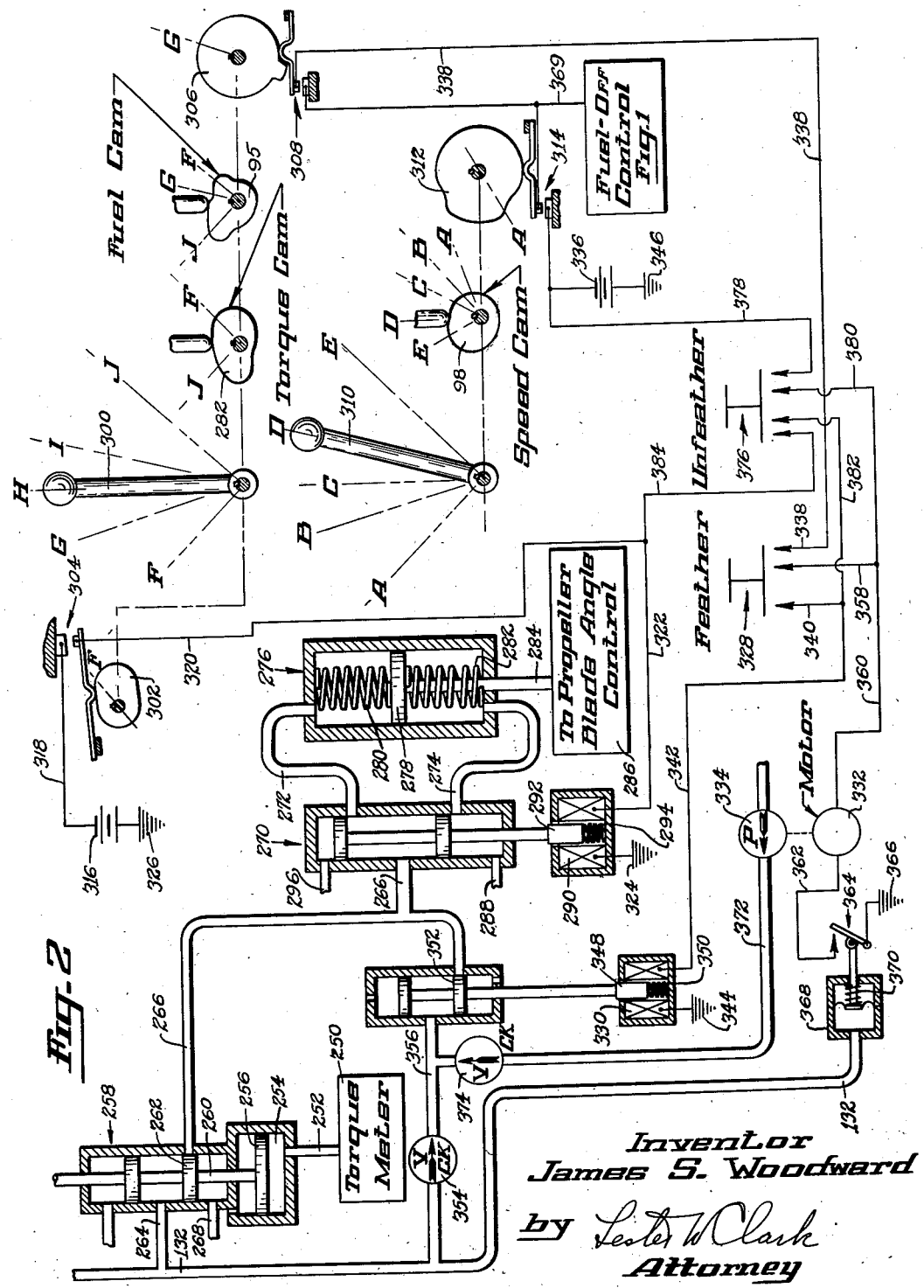
Figure 3:
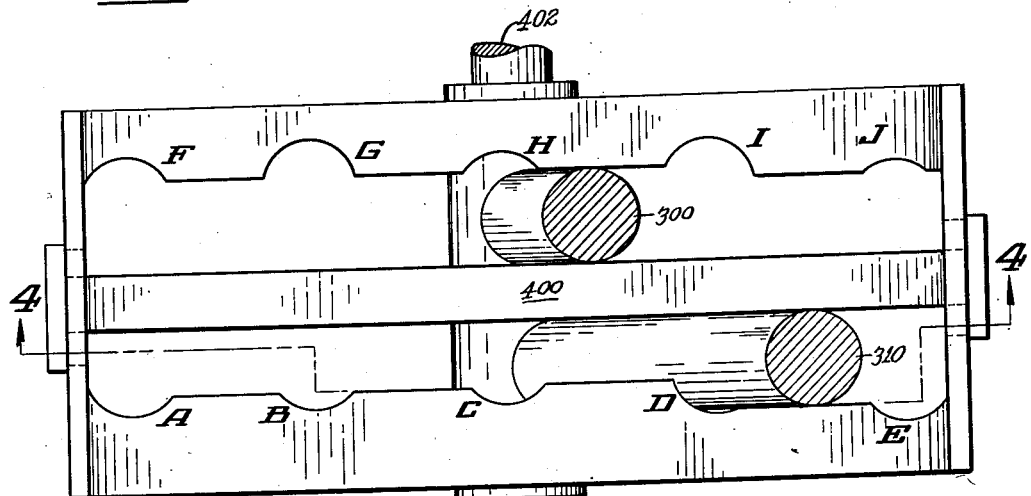
Figure 4:
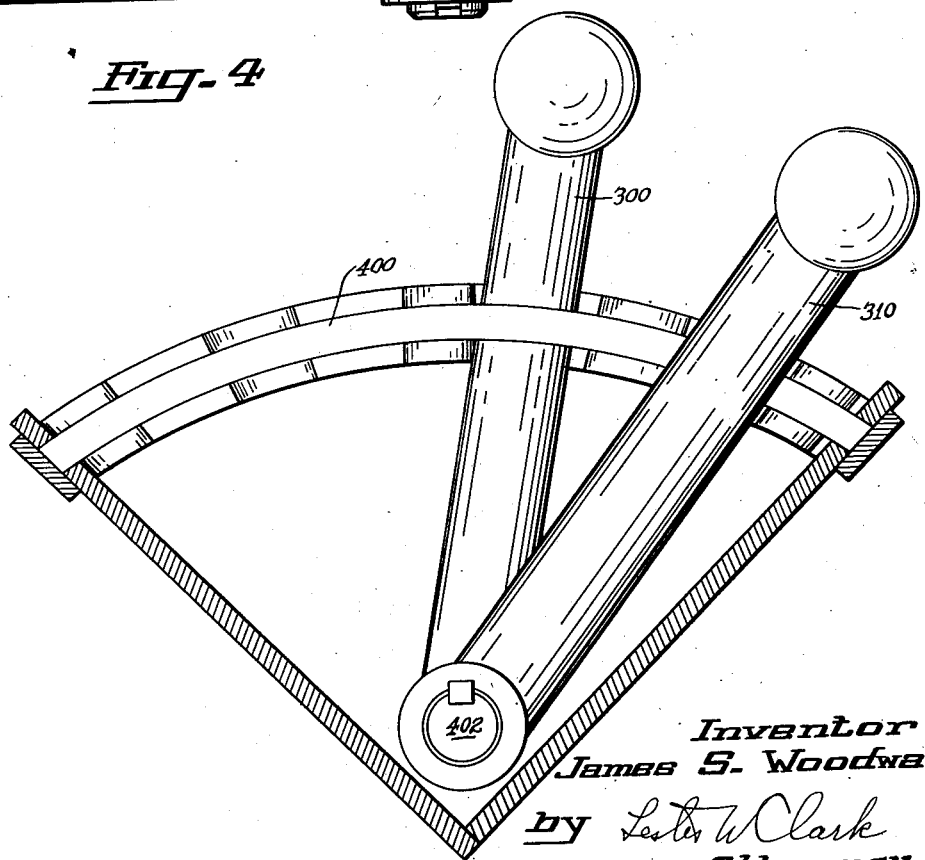

Other advantages and objects of my invention will become apparent from a consideration of the appended specification, claims and drawings, in which Figure 1 illustrates, somewhat diagrammatically, a turbine-jet engine suitable for use on aircraft, and certain portions of a control system adapted for use therewith, Fig. 2 illustrates, somewhat diagrammatically, the remainder of the control system embodying my invention, of which part is shown in Fig. 1, Fig. 3 shows a plan view, partly in section, of mechanism for interlocking the two manual control levers in the system of Fig. 2, and Fig. 4 is an elevational view of the interlocking mechanism shown in Fig. 3, taken on the line 4—4 of Fig. 3, looking in the direction of the arrows.

Referring to the drawings, there is shown in Fig. 1 a jet engine including a casing 10, an air inlet 12, a multiple stage compressor 14, a compressor rotor shaft 16, a combustion chamber 18, which is one of a number of such chambers, and one of a corresponding number of fuel discharge nozzles 20. These nozzles are connected to a generally circular manifold 22 by means of conduits 24. There is also shown a multiple stage turbine 26, a turbine rotor shaft 28 connected to the compressor shaft 16, and a tail pipe 30 for discharging products of combustion from turbine 26. The shafts 16 and 28 are supported by a center bearing 32 and a rear end bearing 34, both of which are supported by the casing 10. A front end bearing is provided for the shaft 16, but is not shown in the drawing. A propeller 40 is connected to the shaft 16 by means of a gear train generally shown at 42. This gear train may also be utilized for operating the fuel pump and other accessories.

Fuel for the engine comes from a tank (not shown) and passes through a conduit 43, a variable delivery pump 44, conduit 46, a cut-off valve mechanism 48, and a conduit 50 leading to the fuel manifold 22.

The cut-off valve 48 includes a piston 52 adapted to block the passageway between conduits 46 and 50. The piston valve 52 is biased to open position by means of a spring 54 and is operable to closed position against the spring 54 by means of an electrical solenoid 56. Energization of solenoid 56 attracts an armature 58 connected to piston valve 52 by a stem 60. Associated with the cut-off valve mechanism 48 is a latching solenoid 62, which operates a plunger 64 biased by a spring 66 to a position adjacent the armature 58.

Energization of solenoid 56 is controlled by a push-button switch 68, marked with the legend "Fuel Off" in the drawing. Energization of solenoid 62 is controlled by a push-button switch 70, marked with the legend "Fuel On" in the drawing.

When switch 68 is closed, a circuit is completed which may be traced from the upper terminal of a battery 72, through a conductor 74, switch 68, conductors 76 and 78, solenoid 56, and ground connections 80 and 82 to the lower terminal of battery 72. Energization of solenoid 56 raises the armature 58, placing piston 52 in a position to block the flow of fuel to the engine. The plunger 64 is biased by spring 66 so that it then moves under armature 58, thereby retaining piston 52 in the fuel cut-off position.

When it is desired to again permit the flow of fuel to the engine, switch 70 is closed. This completes a circuit which may be traced from the upper terminal of battery 72, through conductor 84, switch 70, conductor 86, solenoid 62, and ground connections 88 and 82 to the lower terminal of battery 72. This energizes solenoid 62, causing plunger 64 to be withdrawn to the right so that armature 58 and valve 52 move downward under the influence of spring 54, thereby permitting the flow of fuel to the engine. The construction is such that only a momentary closure of either switch 68 or switch 70 is needed to establish the desired condition of the fuel cut-off valve mechanism 48. After switch 68 has been momentarily closed, the fuel remains cut off until switch 70 is closed. Similarly, after switch 70 is momentarily closed, fuel flow is permitted until switch 68 is again operated.

The delivery of pump 44 may be varied by means of a delivery control 90, which includes a piston 92, biased downwardly by a spring 94. Fluid under pressure acting on the under side of piston 92 moves it upwardly in opposition to spring 94. The space above piston 92 is vented, as indicated at 96.

The fluid pressure acting upwardly on piston 92, hereinafter referred to as the variable control oil pressure, may be varied in response to a number of interacting control devices to be described in detail hereinafter. These devices include a manually operable fuel cam 95, a speed responsive device 97 which is adjustable by means of a manually operated speed cam 98, and a pair of bellows 100 and 102 which together respond to an air pressure differential in the engine.

The bellows 100 has its upper end attached to a fixed support 104, and its lower end attached to an end plate 106. The support 104 and plate 106 are connected by a tension spring 108. Air at the pressure existing at the discharge end of compressor 14 is conveyed to the interior of bellows 100 through a conduit 110.

The bellows 102 has its lower end mounted on a fixed support 112, and its upper end closed by a fixed plate 114. Air at the static pressure existing at the inlet to the compressor 14 is conveyed to the interior of bellows 102 by means of a conduit 116. The plates 106 and 114 are connected by a rigid rod 118.

A lever 120 is pivoted near its center on the rod 118. The left end of lever 120 is connected by means of a pin-and-slot connection to a valve stem 122. The stem 122 extends into and operates a piston valve mechanism 124, of conventional construction, which controls the flow of hydraulic fluid to the opposite ends of a piston type hydraulic servomotor 126.

Hydraulic fluid for operating the servomotor 126 comes from a suitable reservoir (not shown) and flows through a pump 128, which may be engine driven, and which is provided with a discharge pressure regulating relief valve 130. From the pump 128, the fluid, which may be a suitable oil, flows through a conduit 132 to the valve 124. Fluid may pass from the valve 124 to the oil reservoir through drain connections 134 and 136.

The servomotor 126 operates a rod 138, which is connected through pin-and-slot connections to the right end of lever 120, and to bell-crank levers 140 and 142.

Upon an increase in the differential between the compressor discharge pressure and the compressor inlet pressure, bellows 100 is expanded, thereby moving rod 118 downwardly. Lever 120 pivots about its right end, thereby moving stem 122 downward and operating the valve mechanism 124 to supply fluid at high pressure to the upper end of servomotor 126 and to connect the lower end of servomotor 126 to the drain conduit 134. This causes the servomotor to move rod 138 downward, thereby pivoting lever 120 about its center, and raising the valve stem 122. This operation continues until the valve 124 is restored to its original position, wherein no fluid is supplied to servomotor 126.

It may therefore be seen that the valve 124 and servomotor 126 operate to supply a power boost for the bellows 100 and 102, so that the work done through rod 138 as a result of their deflection need not be supplied by the bellows themselves, but is supplied by the oil pressure.

The bell-crank lever 140 is pivotally mounted on a fixed support 144, and its lower end is pivotally connected to a link 146 which carries at its end a circular bearing 148. The bearing 148 slidably contacts on its opposite surfaces a pair of levers 150 and 152. The right end of lever 150 is pivoted on a fixed support 154. The left end of lever 150 is biased downwardly by a spring 156 retained between the end of lever 150 and the fixed support 144.

The left end of lever 152 is pivotally attached to a fixed support 157. Its right end is connected through a pin-and-slot connection to a piston rod 158. Rod 158 is connected to a piston 160 in a motor device 162. The chamber above piston 160 in the motor device 162 is vented to atmosphere at 164. The pressure space below piston 160 in the motor device 162 is supplied with fluid under pressure through a conduit 166.

The position of piston 160 is determined by the balance between the pressure under it acting upward and the force of spring 156, which acts downwardly on piston 160 through the lever 150, bearing 148, lever 152, and rod 158. It may be seen that the lateral position of bearing 148 determines the mechanical advantage between spring 156 and the piston 160.

The pressure below the piston 160 is controlled by a valve mechanism 168, of generally conventional construction. The valve mechanism 168 includes a piston valve having two lands which, in the position shown in the drawing, lie on the opposite sides of a central port leading through conduits 170 and 166 to the chamber below the piston 160. The conduit 166 is also connected through a conduit 172 to the chamber below the piston 92 in the fuel pump delivery control. When the piston valve 168 is moved downward from the neutral position illustrated in the drawing, it admits high pressure fluid from the pump 128 through conduits 174, 176 past valve 168 into conduits 170 and 166, thereby increasing the pressure under the pistons 92 and 160. When the valve is moved upwardly from its neutral position, it connects the spaces under pistons 92 and 160 to a drain conduit 178, thereby decreasing the pressure under the pistons 92 and 160.

The valve 168 is operated by a stem 180, whose upper end is pivoted to a lever 182. The left end of lever 182 is connected through a pin-and-slot connection to the piston rod 158. The right end of lever 182 is spaced slightly above, but may be operated by the fuel cam 95. A spring 184 is retained between lever 182 and fixed support 186, and biases the lever 182 downwardly toward the cam 95. The right extremity of lever 182 is engaged by a lug 187 on a rod 188 operated by a piston 190 in a speed responsive motor device 192.

It may be seen that when the valve 168 is moved downwardly from the position shown, fluid under high pressure is admitted from conduit 176 into conduit 170 and thence through conduit 166 to the chamber under piston 160, thereby raising piston 160 and rod 158, which movement is transmitted through lever 182 back to stem 180 and valve 168 to restore it to its neutral position. Similarly, upward movement of valve 168 results in a downward movement of piston 160.

The speed responsive device 97 includes a pair of flyballs 192. The flyballs are mounted on a head 194 driven by the engine through suitable gearing. The inner ends of the L-shaped flyballs act on a vertically movable rod 196 which is attached at its upper end to a sleeve 198 slidable within a stationary cylinder 200. The lower end of rod 196 extends through the head 194 and is engaged by one end of a tension spring 202. The other end of spring 202 engages a lever 204 which is pivotally mounted at its left end on a fixed support 206. The speed cam 98 engages an intermediate point of lever 204.

A piston valve 208 moves within the sleeve 198, and is connected to a stem 210 which extends upwardly to a point of pivotal attachment with a lever 212. A pin-an-slot connection is used between stem 210 and lever 212. The right end of lever 212 is pivotally attached to a fixed support 214, and its left end is engaged by a lug 216 attached to the rod 188. A spring 211 biases stem 210 downwardly.

The tension of spring 202 may be set by manipulation of cam 98, and determines the speed of the engine at which the sleeve 198 is held by the flyballs in the neutral position wherein the port leading to conduit 218 is blocked. If the engine speed increases above the value determined by the cam setting, then the flyballs 192 move the rod 196 upwardly against the spring 202, thereby moving the sleeve 198 upwardly and admitting fluid at high presure from conduit 174 to a conduit 218 leading to the space under the piston 190. This increases the pressure under piston 190, moving the rod 188 upwardly. This motion is transmitted through lug 216 and lever 212 to the valve stem 210, causing the latter to move upwardly until the valve 208 again blocks the ports leading to conduit 218.

Similarly, if the speed falls below the previously selected value, then the conduit 218 is vented to low pressure through the space below the piston valve 208, the space below the sleeve 198, and the drain connection 220. The valve mechanism 198, valve 208 and the motor device 192 together operate to increase the power available to move the piston rod 188 and its associated mechanism. By the use of the valve and motor device, the power moving the rod 188 is taken from the engine driven pump, rather than from the flyball governor device 97.

When fluid under high pressure is admitted to conduit 218, the piston 190 is raised and lug 187 raises the end of lever 182 and thereby valve 168 to reduce the flow of fuel to the engine. If the engine speed drops below the value selected by the tension of spring 202, then the port leading to conduit 218 is connected to the drain, and piston 190 is lowered. Downward movement of piston 190 causes rod 188 and lug 187 to move downward, and the lever 182 follows this downward movement until its motion is limited by the cam 95. This downward movement of lever 182 moves the valve stem 180 in a fuel flow increasing direction. The cam 95 therefore limits the fuel available to increase the engine speed to its selected value. The cam 95 may therefore be said to limit the rate of acceleration of the engine.

Means are provided to limit the fuel flow whenever the engine exhaust temperature exceeds a predetermined value. This means includes a thermostatic valve controlled by the engine exhaust temperature and indicated diagrammatically at 222. The valve 222 controls a motor device 224. The device 224 includes a piston 226 biased downwardly by means of a spring 228. The space under the piston 26 is connected through a valve 22 and a conduit 230 to the fluid-supply conduit 174 whenever the valve 222 is open. A restricted drain conduit 232 is provided for this space. Whenever valve 222 is open, pressure builds up under the piston 226 because of the restriction 232. If the temperature approaches an unsafe value, the valve 222 opens, increasing the pressure under piston 226 and raising the rod 234 until its upper end engages the lever 182 and moves it upwardly in a fuel flow decreasing direction.

Torque control

The main portion of the torque control is shown in Fig. 2, but certain parts of the torque control of Fig. 2 are repeated in Fig. 1 to show their relationship to the other elements of Fig. 1.

The torque control apparatus utilizes a torque meter, generally indicated at 250 in Fig. 2, which may be of any suitable type. For example, a torque meter such as that shown incidentally in the copending application of Leighton Lee II, Serial No. 654,979, filed March 16, 1946, may be used. This type of torque meter provides a fluid pressure which varies in accordance with the output torque of the engine. This fluid pressure is communicated through a conduit 252 to a chamber 254 under a piston 256 in a control valve mechanism generally indicated at 258. Piston 256 acts upwardly on the stem 260 of a conventional piston valve 262. The control valve mechanism 258 connects the propeller pitch control mechanism selectively to a source of fluid at high pressure, represented herein by the conduits 132 and 264, or to a drain conduit 268.

The control valve mechanism 258 is connected by a conduit 266 and a reversing valve 270 with one or the other of conduits 272 and 274 leading to the opposite ends of the cylinder of a hydraulic servomotor 276. The servomotor 276 includes a piston 278 biased to a central position by means of opposed springs 280 and 282. The piston 278 is connected by a rod 284 to a propeller blade angle control of conventional type. The central position to which piston 278 is biased corresponds to the flat or zero pitch angle of the propeller blades.

When the reversing valve 270 is in the position shown in the drawing, the conduit 272 is connected to the conduit 266. Hence the control valve mechanism 258 regulates the pressure above piston 278, which is moved downwardly from its central position, deflecting spring 282 in proportion to the magnitude of the applied pressure. Conduit 274 is at this time connected through transfer valve 270 to a drain conduit 288. Movement of piston 278 in the lower part of its range of travel causes operation of the propeller blade in its forward thrust range.

Movement of piston 278 above its central position operates the propeller blades in their reverse thrust range. Such operation is accomplished by means of the transfer valve 270. This valve is operated by means of a solenoid 290 which, when energized, attracts an armature 292 connected to valve 270. The armature 292 is biased upwardly by means of a spring 294.

When the solenoid 290 is energized, armature 292 is drawn downward, connecting conduit 274 to the conduit 266, and connecting conduit 272 to a drain conduit 296. The piston 278 of servomotor 276 is then moved in the upper half of its range of travel, its position depending upon the pressure supplied to its under side through conduits 266 and 274.

The positions of the fuel cam 95 and the torque cam 282 are determined by the angular position of a manual control lever 300. The cams 95 and 282 may be on either the same shaft as lever 300 or on a shaft which moves concurrently with lever 300. This shaft also turns a cam 302 which operates a switch 304 and a cam 306 which operates a switch 308.

The speed cam 98 is operated by a manual control lever 310, which also turns a cam 312 operating a switch 314.

The center lines A, B, C, D and E on cam 98 indicate the portions of the cam which engage its associated follower when the control lever 310 is moved to an angular position indicated by the correspondingly lettered center line adjacent it. Similarly, the center lines F, G, H, I and J on cams 95 and 282 indicate the cam portions which are engaged by the respective followers at the several positions of control lever 300.

When control lever 300 is in position G, the fuel flow is set by cam 95 at a minimum value, suitable for idling. At this position of control lever 300, cam 306 closes switch 308 so that the feathering control may be operated. The cam 306 opens switch 308 at all other positions of the manual lever 300, so that the feathering control may not then be operated. The object of this interlock is to prevent feathering of the propeller at a time when an appreciable amount of fuel is being supplied to the engine. Feathering the propeller greatly increases the torque load on the engine shaft and usually results in stalling the engine. If an appreciable quantity of fuel is being delivered and burned in the engine at that time, the engine will overheat and may even burn up.

When the manual lever 300 is moved to the range of positions between position G and position F, the cam 302 operates switch 304 to energize the reversing solenoid 290. The energizing circuit for solenoid 290 may be traced from the upper terminal of a battery 316 through a conductor 318, switch 304, a conductor 320, a conductor 322, solenoid 290 and ground connections 324 and 326 to the lower terminal of battery 316. The fuel flow and propeller torque are then determined by the cams 95 and 282, respectively, but the propeller torque is in the reverse direction, so that the propeller is then used for braking purposes.

The cam 312 and switch 314 interlock the speed control lever 310 with the feathering control so that the latter may not be operated unless the speed control lever is in a minimum speed position. Otherwise, the slowing of the engine by the feathering of the propeller would cause the speed control to respond by calling for an increased fuel flow, which might cause burning up of the engine. Closure of switch 314 also energizes the fuel-off control of Fig. 1 to cut off the fuel supply when lever 310 is moved to position A.

This energizing circuit for the fuel-off control may be traced from the upper terminal of battery 336 through switch 314, a conductor 369, conductor 78 (see Fig. 1), solenoid 56, and ground connections 80 and 346 to the lower terminal of battery 336.

When it is desired to feather the propeller, a push-button switch 328 is depressed. This completes an energizing circuit for a motor 332 driving a hydraulic fluid pump 334. The energizing circuit for solenoid 330 may be traced from the upper terminal of battery 336 through switches 314, 308, a conductor 338, switch 328, conductors 340 and 342, solenoid 330, and ground connections 344 and 346 to the lower terminal of battery 336. Energization of solenoid 330 moves an armature 348 downwardly against the action of a biasing spring 350. Movement of armature 348 operates a feathering valve 352 downwardly, admitting hydraulic fluid at high pressure from supply conduit 132 through check valve 354 in conduit 356 directly to conduit 266 and thence to the upper end of servomotor 276, where it drives piston 278 downwardly in the feathering direction.

The energizing circuit for motor 332 may be traced from the upper terminal of battery 336 through switches 314 and 308, conductor 338, switch 328, conductors 358 and 360, motor 332, conductor 362, switch 364, and ground connections 366 and 346 to the lower terminal of battery 336.

The switch 364 is operated by means of a pressure responsive device generally indicated at 368 which responds to the pressure in supply line 132, and maintains the switch 364 open unless the pressure in the supply line drops below value determined by the strength of a spring 370 in the mechanism 368. As long as the engine is running, fluid under pressure is available at the supply line 132, and it is not necessary to operate the motor driven pump 334 unless the pressure in the supply line 132 fails. The switch 364 keeps the motor from running as long as pressure is maintained in supply line 132. When pump 334 operates, it delivers fluid through a conduit 372 and a check valve 374 to the conduit 356 and thence to the servomotor 276.

When it is desired to unfeather the propeller, a push-button switch 376 is operated. This completes energizing circuits for the motor 332, the feathering solenoid 330, and the reversing solenoid 290. The circuit for motor 332 may be traced from the upper terminal of battery 336 through a conductor 378, switch 376, conductors 380 and 360, motor 332, conductor 362, switch 364, and ground connections 366 and 346 to the lower terminal of battery 336.

The energizing circuit for feathering solenoid 330 may be traced from the upper terminal of battery 336 through conductor 378, switch 376, conductors 382 and 342, solenoid 330, and ground connections 344 and 346 to the lower terminal of battery 336.

The energizing circuit for reversing solenoid 290 may be traced from the upper terminal of battery 336 through conductor 378, switch 376, conductors 384 and 322, solenoid 290, and ground connections 324 and 346 to the lower terminal of battery 336.

This operation is similar to the feathering operation except that the propeller is run in the opposite direction because of the action of the reversing valve 290.

The interlocking between the manual levers 300 and 310 is illustrated in Figs. 3 and 4. Each of the levers operates adjacent a stationary frame member which is provided with a series of notches. These notches have been lettered with reference characters corresponding to those of the center lines indicating the various lever positions in Fig. 2. An interlocking bar 400 lies between the two levers, which are slidable along the shaft 402 on which they are pivoted. It will be readily understood that both levers do not move with the shaft 402 but that the motion of one of them is transmitted to its associated control devices by other means.

The speed control lever 310 is in the cruising range between positions D and E. Position D is the "operational idle" position, and all the positions left to the position D correspond to lower speeds which are used during starting, ground idle, etc. When the speed lever is moved to the extreme left hand position, indicated at A, the fuel is cut off from the turbine by the operation of switch 314, as previously explained.

It should be noted that the construction of the interlocking bar and the depths of the several notches are such that the speed control lever 310 cannot be moved to the left past position D unless the power control lever 300 is at position G, corresponding to minimum fuel flow and torque. Likewise, the power lever 300 cannot be moved out of its minimum torque position unless the speed lever 310 is at least up to the operational idle position.

It should also be noted that the interlocking bar 400 prevents the power control lever 300 from being moved to the right beyond position I unless the speed lever is in its maximum speed position E.

When the engine is shut down, the power lever 300 is at position G and the speed lever 310 is at position A, so that fuel is cut off from the engine. When starting, the engine is first cranked to firing speed, the fuel valve is opened and the speed control lever is advanced to position B, thereby adjusting the fuel rate for proper acceleration of the turbine. The next position C of the speed control lever 310 increases the speed to give the proper air flow to maintain the turbine temperature while idling on the ground. When the speed lever 310 is advanced to position D, the turbine speed is brought up to the lower limit of the range used for normal flying operation, and advancing the speed lever further to E gives top engine speeds for maximum power output.

When the speed lever 310 is in the range from D to E, the power lever 300 can be moved from its minimum torque position G. As the power lever is moved to the right toward positions H, I, and J, the torque cam is rotated to provide increasing propeller torque. At the same time, the fuel cam increases the fuel flow to support this torque.

Although three separate batteries are shown in the drawings, these are shown only to simplify the wiring diagrams. In any practical construction, a single suitable source of electrical energy would be used.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for an internal combustion engine having a fuel supply means, and a variable pitch propeller driven by said engine; comprising: propeller pitch varying means, a fuel supply cut-off mechanism, manual control means movable to a position wherein said control means is effective to operate said mechanism to cut off the flow of fuel to said engine, means for operating said pitch varying means in a direction to feather said propeller, and means for preventing operation of said feathering means unless said manual control means is in said position.

2. Control apparatus for an internal combustion engine and a variable pitch propeller driven thereby, comprising: propeller pitch changing means, means for regulating the fuel supply to said engine, a first manually movable control device, means including said device for controlling both said pitch changing means and said fuel supply regulating means, speed responsive means for additionally controlling the fuel supply, and a second manually movable control device for varying the response characteristic of said speed responsive means; said control devices being operatively interconnected so that the movement of one device is limited by the position of the other device.

3. Control apparatus as in claim 2, including propeller torque measuring means, and in which said means for controlling said pitch changing means includes said torque measuring means and operates said pitch changing means to produce a value of propeller torque determined by the position of said first manually movable control device.

4. Control apparatus as in claim 3, in which said speed responsive means operates to reduce the fuel supply when the speed exceeds a value determined by said second control device, and including interlocking means to prevent the setting of said first control device at a position corresponding to a torque greater than a predetermined minimum value unless said second control device is at a position corresponding to a speed greater than a predetermined value.

5. Control apparatus for an internal combustion engine having a fuel supply means, and a variable pitch propeller driven by said engine; comprising: propeller pitch changing means, propeller torque measuring means, a first manually movable control device, means including said torque measuring means and said control device for controlling said pitch changing means to produce a value of propeller torque determined by the position of said control device, a second manually movable control device, speed responsive means, subject to said second control device, for reducing the fuel supply when the speed exceeds a value determined by the position of said second control device, and interlocking means associated with said first and second control devices to prevent movement of said first control device to a position corresponding to a torque greater than a predetermined intermediate value unless said second control device is in its maximum speed position.

6. Control apparatus as in claim 2, including means for reversing said pitch, and means responsive to a movement of said first control device to a predetermined range of positions for operating said pitch reversing means.

7. Control apparatus as in claim 6, comprising means including said pitch reversing means for feathering and unfeathering said propeller, said unfeathering means being operable independently of said first control device.

8. Control apparatus for an internal combustion engine having an air supply and a fuel supply means, and a variable pitch propeller driven by said engine; comprising: propeller pitch changing means, propeller torque measuring means; means, responsive to the pressure, but independent of the volume, of the air supply to said engine, for regulating said fuel supply means, a first manually movable control device, means including said torque measuring means and said control device for controlling said pitch changing means to produce a value of propeller torque determined by the position of said control device, a second manually movable control device for controlling said fuel supply regulating means, and speed responsive means, operatively associated with said fuel supply means, for reducing the fuel supply to said engine when the speed exceeds a value determined by the position of said second control device.

9. Control apparatus as in claim 8, including means for feathering and unfeathering said propeller, said unfeathering means being manually operable independently of the position of said second control device.

10. Control apparatus as in claim 9, in which said means for controlling said pitch changing means includes pitch reversing means and means responsive to a movement of said first control device to a predetermined range of positions for operating said pitch reversing means, and said unfeathering means also includes said pitch reversing means.

11. Control apparatus as in claim 8, including means responsive to the movement of said second control device to a zero speed position for cutting off the flow of fuel to said engine.

12. Control apparatus as in claim 11, including manually operable means independent of said first control device for feathering said propeller, and means for preventing operation of said feathering means unless said second control device is in said zero speed position.

13. Control apparatus for an internal combustion engine having an air supply and a fuel supply means, and a variable pitch propeller driven by said engine, comprising: propeller pitch changing means, means, responsive to the pressure, but independent of the volume, of the air supply to said engine, for regulating said fuel supply means, a first manually movable control device, means including said device for controlling both said pitch changing means and said fuel supply regulating means, speed responsive means for additionally controlling the fuel supply, and a second manually movable control device for varying the response characteristic of said speed responsive means; said means for controlling said pitch changing means including propeller torque measuring means and operating said pitch changing means to produce a value of propeller torque determined by the position of said first control device.

14. Control apparatus as in claim 13, in which said speed responsive means operates to reduce the fuel supply when the speed exceeds a value determined by said second control device, and including interlocking means to prevent the setting of said first control device at a position corresponding to a torque greater than a predetermined minimum value unless said second control device is at a position corresponding to a speed greater than a predetermined value.

15. Control apparatus for an internal combustion engine and a variable pitch propeller driven thereby, comprising: propeller pitch changing means, means for regulating the fuel supply to said engine, a first manually movable control device, means including said device for controlling both said pitch changing means and said fuel supply regulating means, speed responsive means for additionally controlling the fuel supply, a second manually movable control device for varying the response characteristic of said speed responsive means; means for reversing the pitch of said propeller, and means responsive to a movement of said first control device to a predetermined range of positions for operating said pitch reversing means.

16. Control apparatus as in claim 15, comprising means including said pitch reversing means for feathering and unfeathering said propeller, said unfeathering means being operable independently of said first control device.

17. Control apparatus for a variable pitch propeller, including propeller pitch varying and reversing means, propeller torque measuring means, a manually movable control device, means including said torque measuring means and said control device for operating said pitch varying means to produce a value of propeller torque determined by the position of said control device, and means, responsive to a movement of said control device to a predetermined range of positions and operatively associated with such pitch reversing means, for reversing the pitch of said propeller; said pitch varying means including a hydraulic motor comprising a piston movable in a cylinder and operatively connected to said propeller, and a pair of springs acting oppositely on said piston and biasing it to a central position corresponding to zero pitch of said propeller; and said operating means including means for applying a fluid under a variable pressure to one side of said piston to oppose one of said springs and thereby position said piston on one side of said central position.

18. Control apparatus as in claim 17, in which said reversing means includes a reversing valve for directing the application of said fluid to the opposite side of said piston to oppose the other of said springs and thereby position said piston on the other side of said central position.

19. Control apparatus as in claim 17, comprising means including said reversing valve for feathering and unfeathering said propeller, said unfeathering means being manually operable independently of the position of said control device.

JAMES S. WOODWARD.

References Cited in the file of this patent

UNITED STATES PATENTS

| Number | Name | Date |
|---|---|---|
| 2,207,042 | Waseige | July 9, 1940 |
| 2,217,364 | Halford et al. | Oct. 8, 1940 |
| 2,303,998 | Holley | Dec. 1, 1942 |
| 2,308,228 | Mattencci | Jan. 12, 1943 |
| 2,322,303 | Martin | June 22, 1943 |
| 2,343,378 | Kieser | Mar. 7, 1944 |
| 2,391,629 | Keller | Dec. 25, 1945 |
| 2,402,065 | Martin | June 11, 1946 |
| 2,412,360 | Schorn | Dec. 10, 1946 |
| 2,428,531 | Schorn | Oct. 7, 1947 |